United States Patent
Gooneratne et al.

(10) Patent No.: US 10,560,038 B2
(45) Date of Patent: *Feb. 11, 2020

(54) HIGH TEMPERATURE DOWNHOLE POWER GENERATING DEVICE

(71) Applicant: Saudi Arabian Oil Company, Dhahran (SA)

(72) Inventors: Chinthaka Pasan Gooneratne, Dhahran (SA); Bodong Li, Dhahran (SA); Shaohua Zhou, Cradoc (AU)

(73) Assignee: Saudi Arabian Oil Company, Dhahran (SA)

( * ) Notice: Subject to any disclaimer, the term of this patent is extended or adjusted under 35 U.S.C. 154(b) by 429 days.

This patent is subject to a terminal disclaimer.

(21) Appl. No.: 15/457,058

(22) Filed: Mar. 13, 2017

(65) Prior Publication Data
US 2018/0262126 A1    Sep. 13, 2018

(51) Int. Cl.
*H02N 1/04* (2006.01)
*H02J 7/00* (2006.01)
(Continued)

(52) U.S. Cl.
CPC ........... *H02N 1/04* (2013.01); *E21B 41/0085* (2013.01); *E21B 47/00* (2013.01); *G01V 11/002* (2013.01); *H02J 7/0052* (2013.01); *H02J 7/345* (2013.01)

(58) Field of Classification Search
CPC ...... E21B 47/00; E21B 47/12; E21B 41/0085; G08C 17/02
(Continued)

(56) References Cited

U.S. PATENT DOCUMENTS

| 4,597,067 A | * | 6/1986 | Bockhorst | ............... E21B 47/16 175/40 |
| 5,839,508 A | | 11/1998 | Tubel et al. | |

(Continued)

FOREIGN PATENT DOCUMENTS

| GB | 2419362 A | 4/2006 |
| WO | WO2016185235 A1 | 11/2016 |

OTHER PUBLICATIONS

International Search Report and Written Opinion for International Application No. PCT/US2018/022107 (SA5620); International Filing Date Mar. 13, 2018; Report dated Jun. 20, 2018 (pp. 1-13).
(Continued)

*Primary Examiner* — Omar Casillashernandez
(74) *Attorney, Agent, or Firm* — Bracewell LLP; Constance G. Rhebergen; Vivek P. Shankam

(57) ABSTRACT

A high temperature downhole power generating device includes a power generator including a first material of one polarity and a second material that is fixed in position and is of opposite polarity of the first material, wherein the first material is propelled toward the second material based on motion of the high temperature downhole power generating device so that the two materials have a maximized point of contact to generate maximum power, at least one electrode that is connected to the first material or second material, a bridge rectifier connected to the at least one electrode to transform the power generated into direct current from alternating current, a storage unit for storing the power generated by the power generator, a sensor that gathers information concerning a downhole environment, and a microcontroller and transceiver unit to manage the power generated by the power generator and transmit information gathered by the sensor.

27 Claims, 5 Drawing Sheets

(51) Int. Cl.
*E21B 41/00* (2006.01)
*E21B 47/00* (2012.01)
*G01V 11/00* (2006.01)
*H02J 7/34* (2006.01)

(58) Field of Classification Search
USPC .................................................. 340/854.6
See application file for complete search history.

(56) References Cited

U.S. PATENT DOCUMENTS

| | | | |
|---|---|---|---|
| 6,324,904 B1 | 12/2001 | Ishikawa et al. | |
| 6,691,802 B2 | 2/2004 | Schultz et al. | |
| 6,745,833 B2 | 6/2004 | Aronstam et al. | |
| 6,976,535 B2 | 12/2005 | Aronstam et al. | |
| 7,165,608 B2 | 1/2007 | Schultz et al. | |
| 7,190,084 B2 | 3/2007 | Hall et al. | |
| 7,714,741 B2 | 5/2010 | Snider et al. | |
| 7,729,860 B2 | 6/2010 | Pabon et al. | |
| 7,849,919 B2 | 12/2010 | Wood et al. | |
| 8,179,278 B2 * | 5/2012 | Shakra | E21B 47/12 175/40 |
| 8,511,373 B2 | 8/2013 | Tosi et al. | |
| 8,581,427 B2 | 11/2013 | Schoonover | |
| 8,604,634 B2 | 12/2013 | Pabon et al. | |
| 8,714,239 B2 | 5/2014 | Tosi et al. | |
| 9,063,252 B2 | 6/2015 | Kamal et al. | |
| 9,091,145 B2 * | 7/2015 | Colvin | E21B 43/30 |
| 9,115,573 B2 | 8/2015 | Purkis et al. | |
| 9,181,797 B2 * | 11/2015 | Zientarski | H04B 13/02 |
| 9,284,834 B2 * | 3/2016 | Alteirac | E21B 47/12 |
| 9,359,841 B2 | 6/2016 | Hall | |
| 9,366,134 B2 | 6/2016 | Walton et al. | |
| 9,429,559 B2 | 8/2016 | Radjy | |
| 9,453,410 B2 * | 9/2016 | Logan | E21B 4/14 |
| 9,732,879 B2 | 8/2017 | Jaffrey | |
| 9,822,631 B2 | 11/2017 | Ravi et al. | |
| 9,879,519 B2 | 1/2018 | Roberson et al. | |
| 10,072,495 B1 * | 9/2018 | Gooneratne | E21B 47/122 |
| 10,320,311 B2 * | 6/2019 | Gooneratne | H02N 1/04 |
| 2001/0054969 A1 | 12/2001 | Thomeer et al. | |
| 2006/0016606 A1 * | 1/2006 | Tubel | E21B 41/0085 166/386 |
| 2006/0064826 A1 | 3/2006 | Kimball | |
| 2008/0007421 A1 | 1/2008 | Liu et al. | |
| 2008/0257546 A1 | 10/2008 | Cresswell et al. | |
| 2008/0265712 A1 | 10/2008 | Ulm et al. | |
| 2009/0038848 A1 | 2/2009 | Garcia-Osuna | |
| 2009/0101329 A1 | 4/2009 | Clem et al. | |
| 2009/0166045 A1 | 7/2009 | Wetzel et al. | |
| 2009/0271117 A1 | 10/2009 | Ayoub et al. | |
| 2010/0133006 A1 | 6/2010 | Shakra et al. | |
| 2011/0050181 A1 | 3/2011 | Post et al. | |
| 2011/0169276 A1 | 7/2011 | Akamatsu | |
| 2011/0210645 A1 | 9/2011 | Mason | |
| 2012/0032560 A1 | 2/2012 | Ochoa et al. | |
| 2012/0146806 A1 | 6/2012 | Purkis | |
| 2013/0118733 A1 | 5/2013 | Kumar | |
| 2013/0155631 A1 | 6/2013 | Yamauchi et al. | |
| 2014/0069639 A1 | 3/2014 | MacKenzie et al. | |
| 2014/0084748 A1 | 3/2014 | Wang et al. | |
| 2014/0210307 A1 | 7/2014 | Tosi et al. | |
| 2014/0246950 A1 | 9/2014 | Wang et al. | |
| 2014/0265580 A1 | 9/2014 | Cooley et al. | |
| 2014/0292138 A1 * | 10/2014 | Wang | H02N 1/04 310/300 |
| 2014/0300248 A1 * | 10/2014 | Wang | G01L 9/0072 310/300 |
| 2014/0338458 A1 | 11/2014 | Wang et al. | |
| 2015/0115748 A1 | 4/2015 | Shimanouchi et al. | |
| 2015/0218885 A1 | 8/2015 | Sitka | |
| 2015/0330212 A1 | 11/2015 | Sassi et al. | |
| 2016/0010427 A1 | 1/2016 | Kelbie et al. | |
| 2016/0252071 A1 | 9/2016 | Phillips et al. | |
| 2017/0346416 A1 * | 11/2017 | Rutgers | H02N 1/04 |

OTHER PUBLICATIONS

International Search Report and Written Opinion for International Application No. PCT/US2018/022099 (SA5622); International Filing Date Mar. 13, 2018; Report dated Jun. 20, 2018 (pp. 1-13).

* cited by examiner

HIGH TEMPERATURE DOWNHOLE POWER GENERATING DEVICE

BACKGROUND

1. Field

Embodiments of the present disclosure relate to a power generator used in an oil and gas well, which generates power based on friction generated by two materials of opposite polarity.

2. Description of Related Art

Background

Drilling tools play a key role in the successful drilling of wells and meeting performance objectives. The objective when drilling wells to total depth is to drill safely and quickly as possible. Obtaining information about the downhole environment is a critical component of the drilling process and is achieved by including surveying and logging tools in the bottomhole assembly (BHA) of a drill string.

Power to measurement while drilling (MWD) and logging while drilling (LWD) tools as well as the data communication devices is generally provided by a turbine generator and/or battery pack. The turbine is used to generate electricity by mud flow in the drill string. The turbine and/or battery pack in the BHA provides sufficient power to run the sensors and instrumentation in the MWD and LWD tools but are expensive and take up a large amount of space in the drill string. They also require regular maintenance when the drill string is pulled out of the hole after a job, which takes time and is costly, and the turbine can only provide power to the MWD and LWD tools when there is a mud flow in the drill string. Batteries are used when continuous power is required in the absence of a mud flow. However, batteries are also expensive, requires maintenance or replacement and has the added cost of safe disposal due to the chemicals they contain. Moreover, the chemicals could leak into the formation and affect the stability of the well. All types of batteries in general, even with a large energy storage density, drain out over time and high temperatures downhole accelerate this process. Power generation turbine (if installed close to the mud pulser and above a LWD tool) may also prevent the retrieval of radio-active chemical sources with the LWD tool, if the drilling BHA is stuck during drilling operation and cannot be pulled out of the well.

Energy can be harvested from the many energy sources available in a downhole environment such as mud flow, vibration, and temperature, to generate electricity. Electromagnetic induction can be used to generate electricity when mud flow provides energy to a turbine coupled with an alternator. In addition to rotational vibration, a magnet and a spring can also be used to generate electricity by electromagnetic induction. Energy applied by vibration to a spring connected to a mass and magnet inside a coil produces an alternating current when the magnet moves inside the coil. However, magnets are expensive and the electronics involved to optimize the energy conversion efficiency is complex. Moreover, magnets may be affected by drill pipes. Therefore, expensive non-magnetic drill collars have to be used to negate the influence of the drill pipes. The power can also be generated by a thermogenerator via the Seeback effect or the Pyroelectric effect. The heat difference inside and outside the drill string can be used to generate electricity. However, this method has a strong dependence on the constant presence of a thermal gradient and it may be difficult to integrate these thermogenerators with other sensors and communication devices. Moreover, mounting these thermogenerators on a drill string to optimize the required thermal gradient is challenging.

Therefore there is a need for a compact logging or measurement tool that generates its own energy and does not take up a lot of space on a drill string.

SUMMARY

Accordingly, one example embodiment is a high temperature downhole power generating device including a power generator including a first material of one polarity and a second material that is fixed in position and is of opposite polarity of the first material, wherein the first material is propelled toward the second material based on motion of the downhole power generating device so that the two materials have a maximized point of contact to generate maximum power, at least one electrode that is connected to the first material or second material, a bridge rectifier connected to the at least one electrode to transform the power generated into direct current from alternating current, a storage unit for storing the power generated by the power generator, at least one sensor that gathers information concerning a downhole environment, and a microcontroller and transceiver unit to manage the power generated by the power generator and transmit information gathered by the at least one sensor. According to one example embodiment, the first material may be suspended using one or more coil springs. The device may also include a turbine such as a hydroturbine, pelton runner etc, operatively coupled to the first material for causing the first material to move towards the second material and away from the second material, with the aid of a linear motion generator such as a crank/slider-crank, a dwell cam system or mechanical gears. According to one example embodiment, the storage unit includes one of ceramic film capacitors, electrolytic capacitors, supercapacitors, double-layer capacitors, or pseudo-capacitors. The motion may be caused due to vibration, rotation, mud flow, or noise in a drill string carrying the downhole power generating device. According to one example embodiment, the first material and the second material are selected from the group consisting of Copper, Aluminum, Polytetrafluoroethylene (PTFE), Polyimide, Lead, Elastomer, Polydimethylacrylamide (PDMA), Nylon, Polyester, a fire-resistant material or any other material that can cause static electricity. The device may also include a first housing for housing the power generator, the electrode, and the bridge rectifier, wherein the first housing includes a polymeric material, and a second housing for housing the storage unit, the microcontroller, and transceiver unit, the second housing including a material selected from the group consisting of certain solids, transition metals, as well as high strength alloys and/or compounds of the transition metals, and high temperature dewars.

Another example embodiment is a method for power generation in a high temperature drilling environment. The method may include providing a first material of a first polarity, wherein the first material is not in a fixed position, providing a second material of opposite polarity of the first material, wherein the second material is in a fixed position, propelling the first material toward the second material based on inherent motion in the drilling environment so that the first material and the second material have a maximized point of contact to generate maximum power, operatively coupling at least one electrode to the first material or second material, operatively coupling a bridge rectifier to the at least one electrode to transform the power generated into direct current from alternating current and storing, in a storage unit, the power generated by friction between the first material and the second material. The method may also include operatively coupling at least one sensor to gather information concerning a downhole environment, and operatively coupling a microcontroller and transceiver unit to manage the power generated by the first material and the second material, and transmit information gathered by the at least one sensor. According to one example embodiment, the first material may be suspended using one or more coil springs. The method may also include operatively coupling a turbine to the first material for causing the first material to move towards the second material and away from the second material with the aid of a linear motion generator. The storage unit may include one of ceramic film capacitors, electrolytic capacitors, supercapacitors, double-layer capacitors, or pseudo-capacitors. The motion may be caused due to vibration, rotation, mud flow, or noise in a drill string in the drilling environment. According to one example embodiment, the first material and the second material are selected from the group consisting of Copper, Aluminum, Polytetrafluoroethylene (PTFE), Polyimide, Lead, Elastomer, Polydimethylacrylamide (PDMA), Nylon, Polyester, a fire-resistant material or any other material that can cause static electricity. The method may also include providing a first housing for housing the power generator, the electrode, and the bridge rectifier, wherein the first housing includes a polymeric material, and providing a second housing for housing the storage unit, the microcontroller, and transceiver unit, wherein the second housing includes material selected from the group consisting of certain solids, transition metals, as well as high strength alloys and/or compounds of the transition metals, and high temperature dewars.

Another example embodiment is a high temperature downhole power generator including a first material of first polarity, wherein the first material is not in a fixed position, a second material that is fixed in position and is of opposite polarity of the first material, wherein the first material is propelled toward the second material based on motion in the downhole environment so that the first material and the second material have a maximized point of contact to generate maximum power, and a storage unit for storing the power generated by friction between the first material and the second material. The device may also include at least one electrode that is connected to the first material or second material, and a bridge rectifier connected to the at least one electrode to transform the power generated into direct current from alternating current. According to one example embodiment, the first material is suspended using one or more coil springs. The device may also include a turbine operatively coupled to the first material for causing the first material to move towards the second material and away from the second material. The storage unit includes one of ceramic film capacitors, electrolytic capacitors, supercapacitors, double-layer capacitors, or pseudo-capacitors. According to one example embodiment, the first material and the second material are selected from the group consisting of Copper, Aluminum, Polytetrafluoroethylene (PTFE), Polyimide, Lead, Elastomer, Polydimethylacrylamide (PDMA), Nylon, Polyester, a fire-resistant material or any other material that can cause static electricity.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. The term "high temperature" as referred to herein refers to temperatures above 125° C., as it may be apparent to one of ordinary skill in the art.

Figure 1:
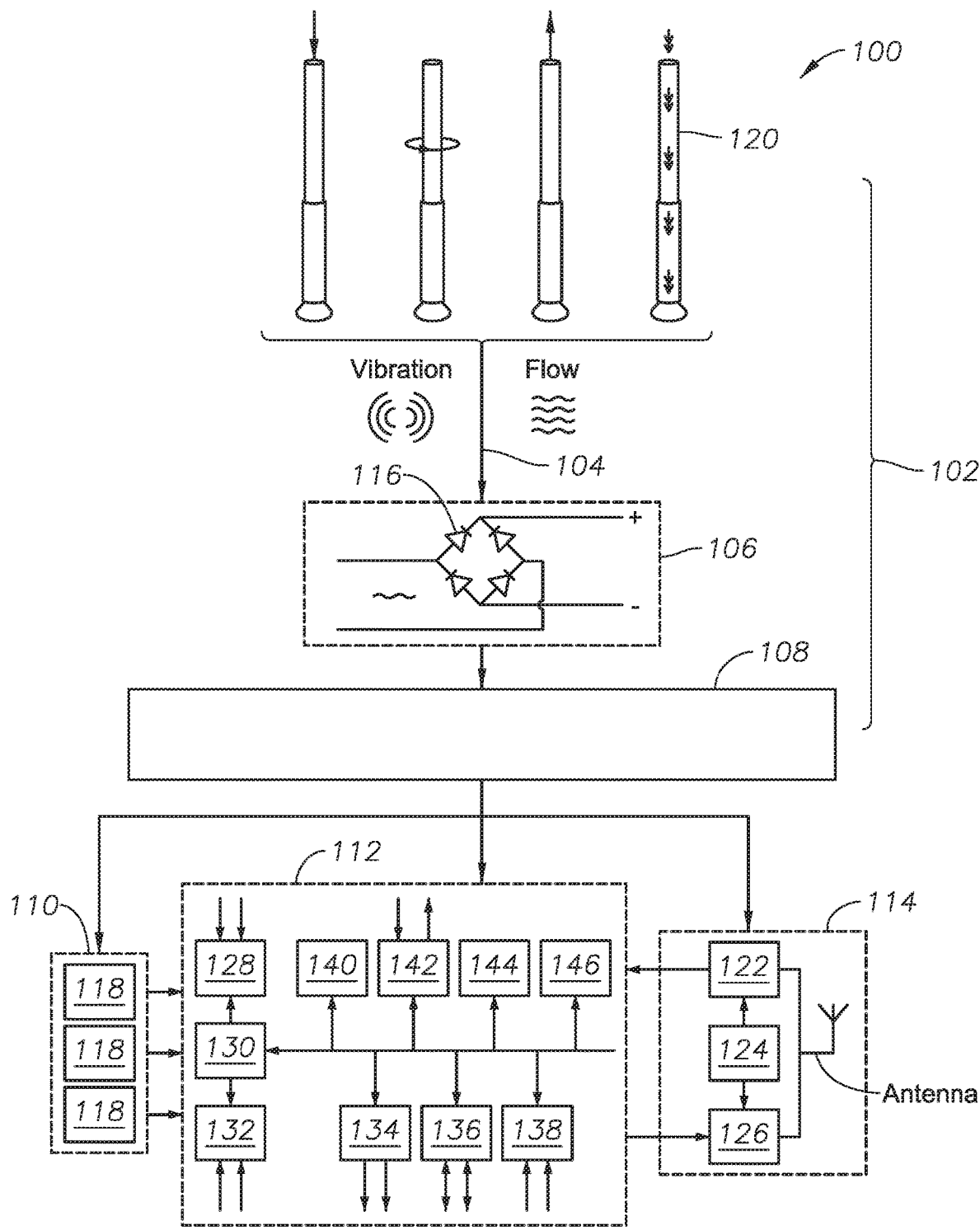
FIG. 1 is a block diagram illustrating a high temperature downhole power generating device, according to one or more example embodiments.

Turning now to the figures, drill strings 120 are exposed to a variety of environments such as high temperature, pressure, torque, vibration and rotation during the drilling process. The drill string 120 experiences axial, lateral and torsional vibration for example, when it is drilling a formation, when it is being pulled out of a hole, when it is being run inside a hole and during a reaming trip. As FIG. 1 shows, the energy contained in these motions can be extracted for generating electricity.

One example embodiment is a high temperature downhole power generating device 100 including a power generator 102. The power generator 102 can generate electricity by friction and can be utilized in a well to fully exploit the available downhole energy sources. Vibration can be triggered directly by mechanical motion and mud flow and in-directly with mud flow and the use of a mini-turbine, for example. Generating electricity by friction is based on the principle that an object becomes electrically charged after it contacts another material through friction. When they contact, charges move from one material to the other. Some materials have a tendency to gain electrons and some to lose electrons. If material A has a higher polarity than material B, then electrons are injected from material B into material A. This results in oppositely charged surfaces. When these two materials are separated there is a current flow, when a load is connected between the materials, due to the imbalance in charges between the two materials. The current flow continues until both the materials are at the same potential. When the materials move towards each other again there will be a current flow but in the opposite direction. Therefore, this contact and separation motion of materials can be used to generate electricity. The surfaces can be modified to increase the friction between materials and to increase the surface charge density by fabricating structures such as nano-pillars, patterning and depositing nanoparticles. According to one example embodiment, material A and material B may be selected from the group consisting of Copper, Aluminum, Polytetrafluoroethylene (PTFE), Polyimide, Lead, Elastomer, Polydimethylacrylamide (PDMA), Nylon, Polyester, a fire-resistant material or any other material that can cause static electricity. A detailed description of the power generator 102 will be described in further detail with reference to FIGS. 2-5.

The generated electrical energy first has to be changed from an alternating current to a direct current. This can be achieved by a bridge rectifier circuit 106 employing diodes 116 as shown in FIG. 1. The bridge rectifier may be connected to material A or material B using one or more electrodes 104. The downhole power generator 102 continues generating electricity as long as the contact and separation mechanism is in motion. A more feasible way to optimize this generated electricity is to store the electrical energy so that it can be used as a regulated power source even when there is insufficient vibration or mud flow. The storage unit 108 can be either a di-electric capacitor for use at high temperatures, a ceramic, an electrolytic or a super capacitor. By storing the energy in a capacitor, power can be provided continuously to the sensors, instrumentation and communication devices. Compared to batteries, capacitors are easier to integrate into a circuit, are generally cheaper, can be bought off the shelf and are easier to dispose. According to one example embodiment, the storage unit includes one of ceramic film capacitors, electrolytic capacitors, supercapacitors, double-layer capacitors, or pseudo-capacitors.

The storage unit 108 provides power to the microcontroller unit 112, which performs the power management and control functions of the system 100. The microcontroller unit 112 may include one or more processors 130, which may be connected to a flash memory 140, external memory 134, interface(s) 142, EEPROM 144, RAM 146, input/output ports 136, and timers 138 using one or more buses 150. The one or more processors 130 may also be connected to an interrupt control 128, and an oscillator or accelerometer 132, such as a MEMS accelerometer, for example. The microcontroller type may be 8051, PCI, AVR or ARM, for example. The microcontroller 112 is connected to a transceiver and an antenna unit 114. The transceiver 114 employs low power wireless technologies such as low-power Wi-Fi, Bluetooth, Bluetooth Low Energy (BLE), ZigBee, etc. Higher frequencies allow a better signal and a longer transmission distance. However, the system 100 must be optimized since attenuation and power requirements are also higher at higher frequencies. The antennas 114 can be directional, omni-directional and point-to-point. They can also be planar antennas such as monopole, dipole, inverted, ring, spiral, meander and patch antennas. According to one example embodiment, the transceiver and an antenna unit 114 may include a transmitter 126, a receiver 122, a clock 124, and one or more antennas, for example.

The microcontroller unit 112 may be operatively coupled to a sensor unit 110, which may include one or more sensors 118. Sensors 118 may be used for MWD or LWD purposes, and may include a variety of sensors that perform MWD and LWD functions, as known to one of skill in the art.

The example embodiments described herein provide for two main ways to capture the energy created by downhole vibrations, due to mechanical motions such as rotation of the drill string 120, and hydraulic motions such as mud flow. The designs aim to optimize the mechanical and hydraulic triggering required to optimize the generation of electricity.

Figure 2:
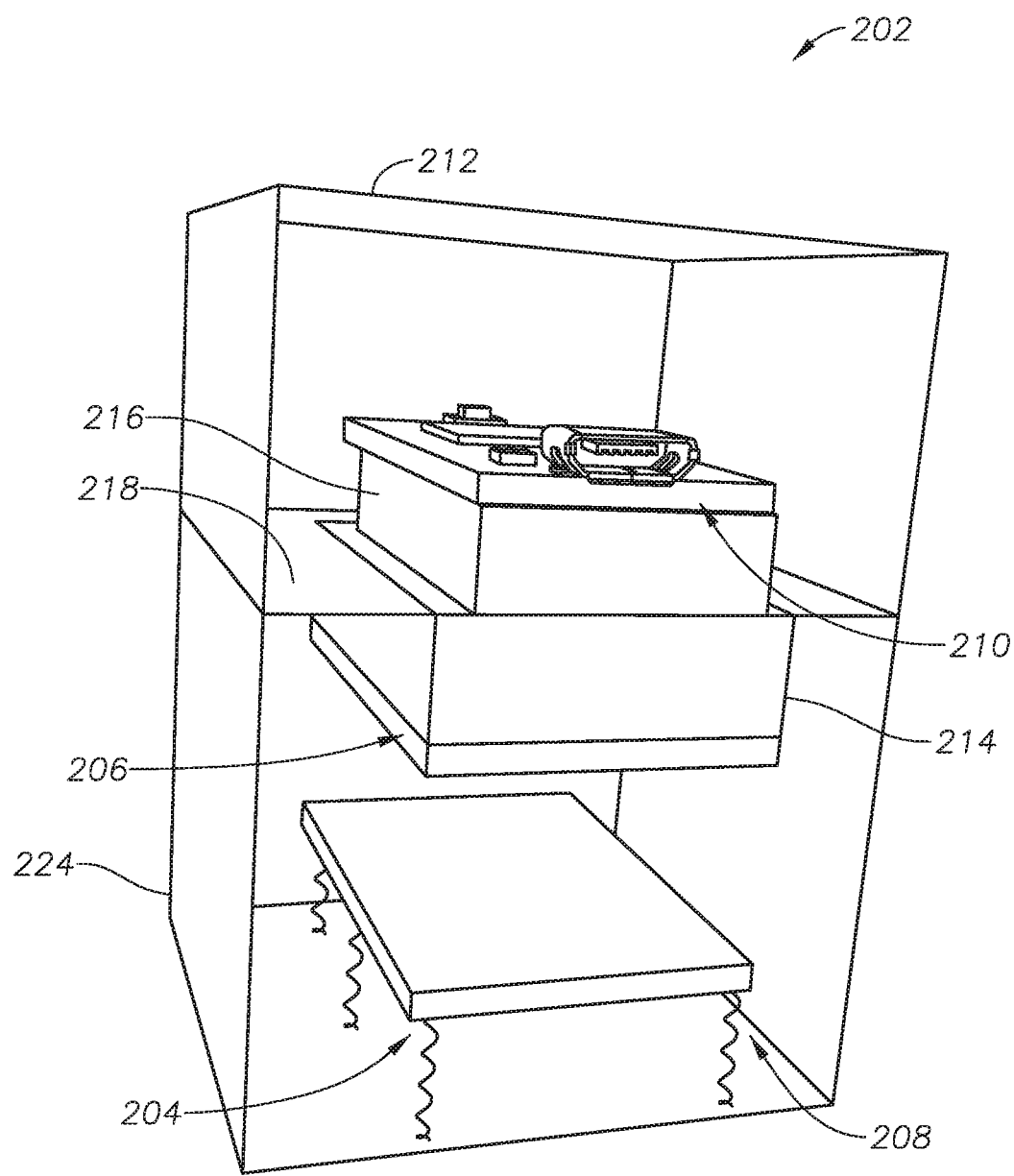
FIG. 2 is a schematic of a high temperature downhole power generating device comprising a high temperature downhole power generator, as well as sensors and instrumentation, according to one or more example embodiments.
Figure 3:
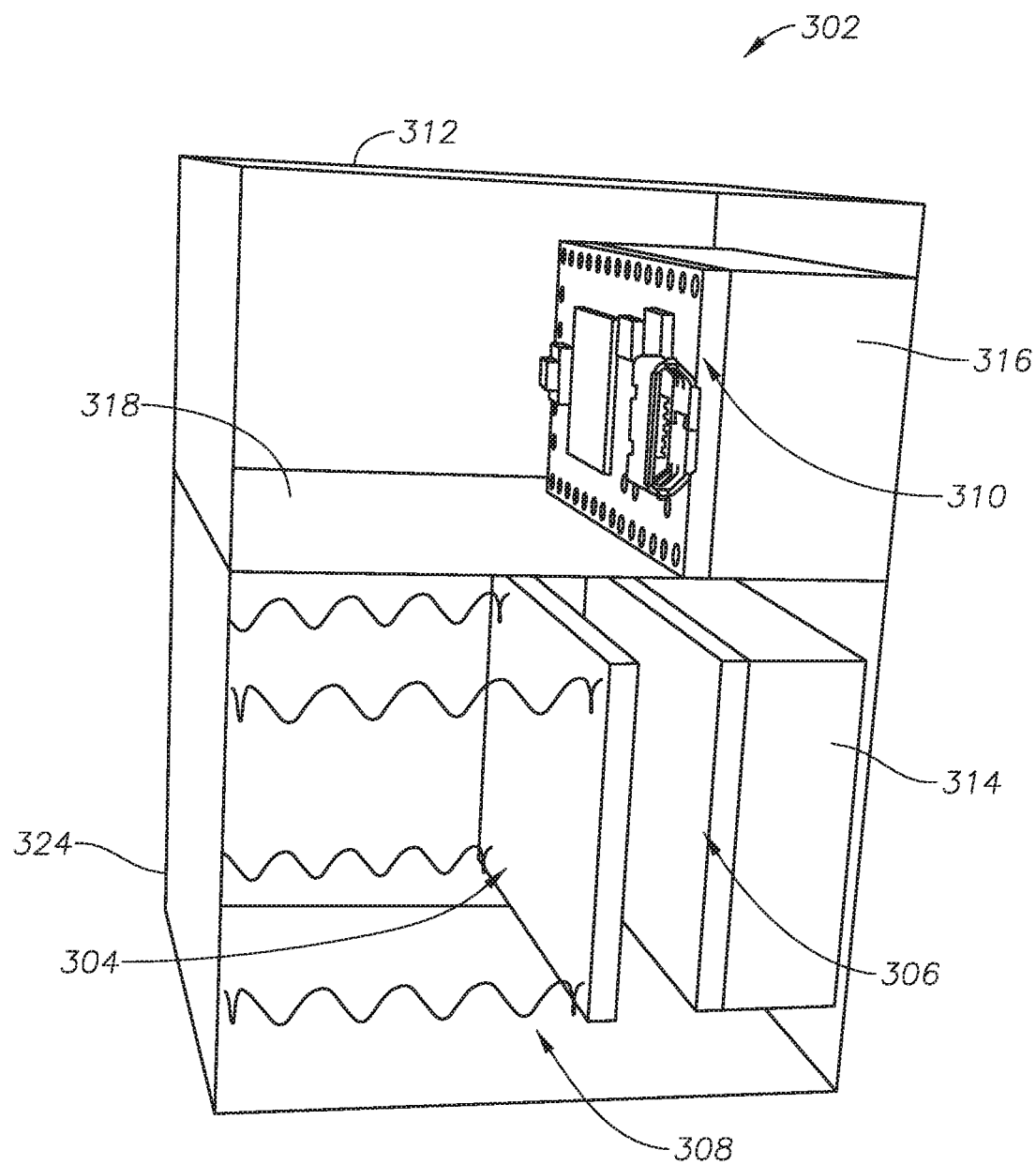
FIG. 3 is a schematic of a high temperature downhole power generating device comprising a high temperature downhole power generator, as well as sensors and instrumentation, according to one or more example embodiments.

The first system 202, 302, as illustrated in FIGS. 2 and 3, for example, utilizes springs 208, 308 to propel a material 204, 304 (material A) attached to the springs 208, 308 towards another different material 206, 306 (material B), which is opposite in polarity to material A and is fixed, when there is vibration due to rotation and/or mud flow and/or noise. The stiffness of the springs 208, 308 is optimized to maximize the contact and separation motion and can be any size and shape to move and constrain material A only in the direction of material B. The springs 208, 308 are designed in such a way to minimize motion retardation and experience compression and extension at the same time. The springs 208, 308 also contribute to the momentum of material A contacting material B therefore, increasing the charge transfer between the two materials. Generally springs obey Hook's law and produce restorative forces directly proportional to their displacement. They store mechanical energy in the form of potential energy and release it as the restorative force, resulting in a constant spring coefficient. Springs 208, 308 can also be tuned to produce restorative forces that are not proportional to their displacement. These springs are not governed by Hook's law so they can be made to provide restorative forces as required by the application. The springs 208, 308 that may be used can be compression, extension, torsion, Belville springs or any other system made from elastic materials.

As illustrated in FIGS. 2 and 3, material 206, 306 is fixed on a block 214 314, on the inner drillstring interface, which insulates the connection from the power generator to the MTU 210 310. Depending on the direction of the vibration, axial and/or lateral and/or torsional, material 204, 304 contacts the fixed material 206, 306 vertically and/or slide against it and then separate. This contact and separation mechanism generates electricity as it may be apparent to one of skill in the art. There are vibrations when the drill pipe is rotated, when running in hole, pulling out of hole, drilling or reaming as well due to the noise generated from these motions. Moreover, mud flow carries kinetic energy and the magnitude of this energy is related to the speed and duration of the mud flow, which can be controlled at the surface. When the mud flow contacts the housing where the power generator is located it captures the kinetic energy from the mud and transfer this kinetic energy into vibration. The vibration of the housing triggers the motion of the springs, which moves material 204, 304, attached to them, towards the other different material, material 206, 306, which is anchored and stationary, which results in contact first and then separation. This motion may continue as long as there is vibration.

In FIG. 2 material 204 is connected by springs 208 attached to housing 224. The materials 204, 206 are rectangular in shape, but can be square, circular, triangular or any shape that maximizes the contact area, and they are positioned vertically to maximize the contact area due to lateral vibrations by contacting vertically but also to slide during axial and/or torsional vibration. In FIG. 3, materials 304, 306 are positioned horizontally to maximize the contact area due to axial vibration but also to slide during lateral and torsional vibration. In FIGS. 2-5, the microcontroller and transceiver unit (MTU) 210, 310, 410, 510 is in a special housing 212, 312, 412, 512 to minimize vibration and temperature either inside/outside the drill string 120 and therefore, is different from the housing of the power generator 224, 324, 424, 524. The housing 212, 312, 412, 512 may include a material selected from the group consisting of certain solids, transition metals, as well as high strength alloys and/or compounds of the transition metals, and high temperature dewars. According to one example embodiment, the microcontroller and transceiver unit (MTU) 210, 310, 410, 510 may be mounted on a block 216, 316, 416, 516, which may insulate the connection from the power generator portion to the MTU using a separator 218, 318, 418, 518. In order to minimize vibrations in the MTU 210, 310, 410, 510, mounts and valves can be installed to isolate vibrations, and materials such as Steel, Titanium, Silicon Carbide, Aluminum Silicon Carbide Inconel and Pyroflask, can be used to reduce the effect of high temperature. The material for housing 224, 324, 424, 524 of the power generator on the other hand should be designed to preserve its flexibility and elasticity to maximize vibrations and hence, improve the energy conversion efficiency. However, it but must be optimized so that the building blocks of the power generator will not be damaged. Therefore, for optimization we use specific materials for the building blocks of the power generator as described below. The housing 224, 324, 424, 524 can be designed from a polymer material such as elastomer, which is already used in downhole tools, or any other material that has excellent heat conduction properties and a low Young's modulus. Packaging and housing is mainly done to protect the power generator from mud and other fluids in the formation, which may degrade its performance. However, it is important that the packaging and housing does not in any way influence the energies being harvested by reducing the vibration for example. The housing 224, 324, 424, 524 and packaging should maintain or amplify the energies being harvested.

Figure 4:
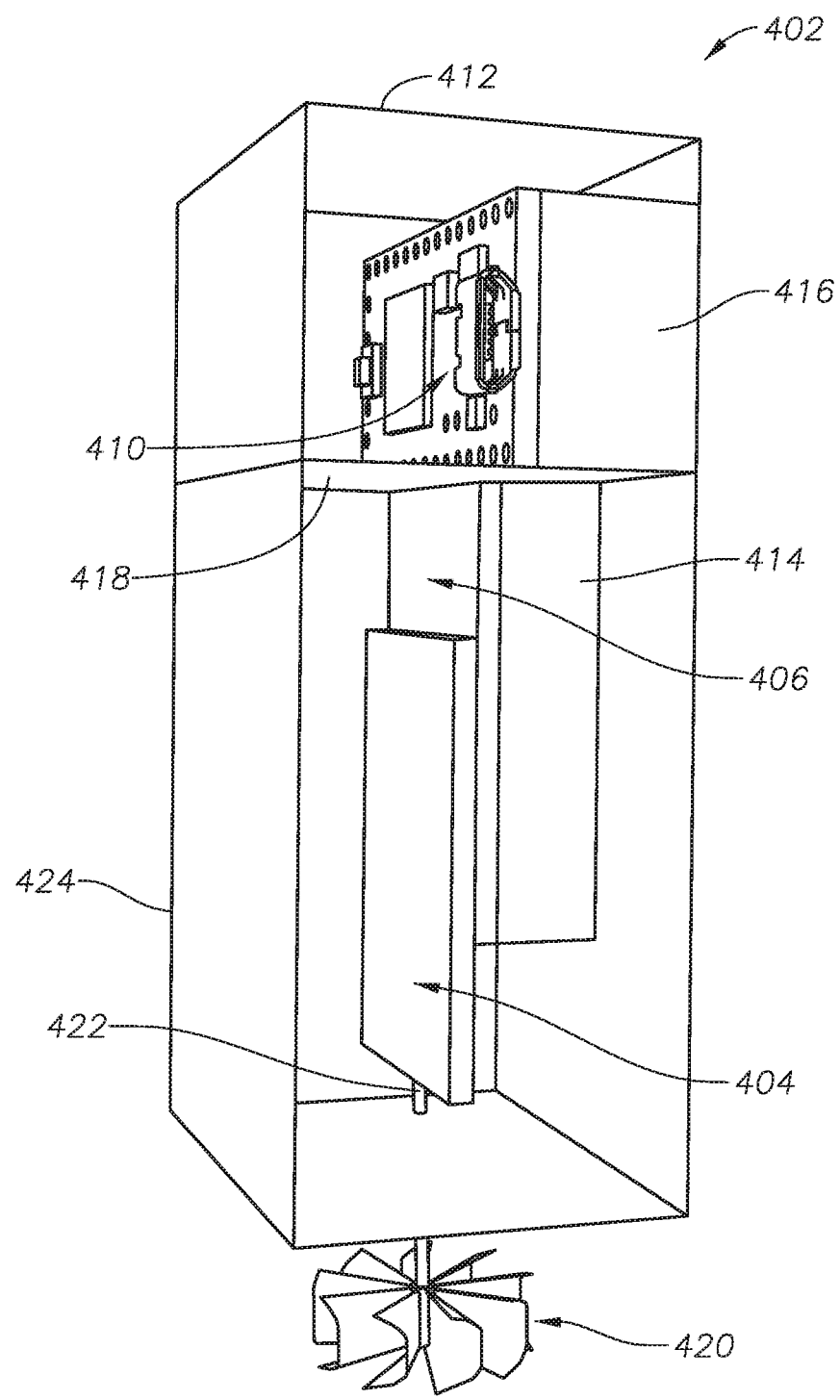
FIG. 4 is a schematic of a high temperature downhole power generating device comprising a high temperature downhole power generator, as well as sensors and instrumentation, according to one or more example embodiments.
Figure 5:
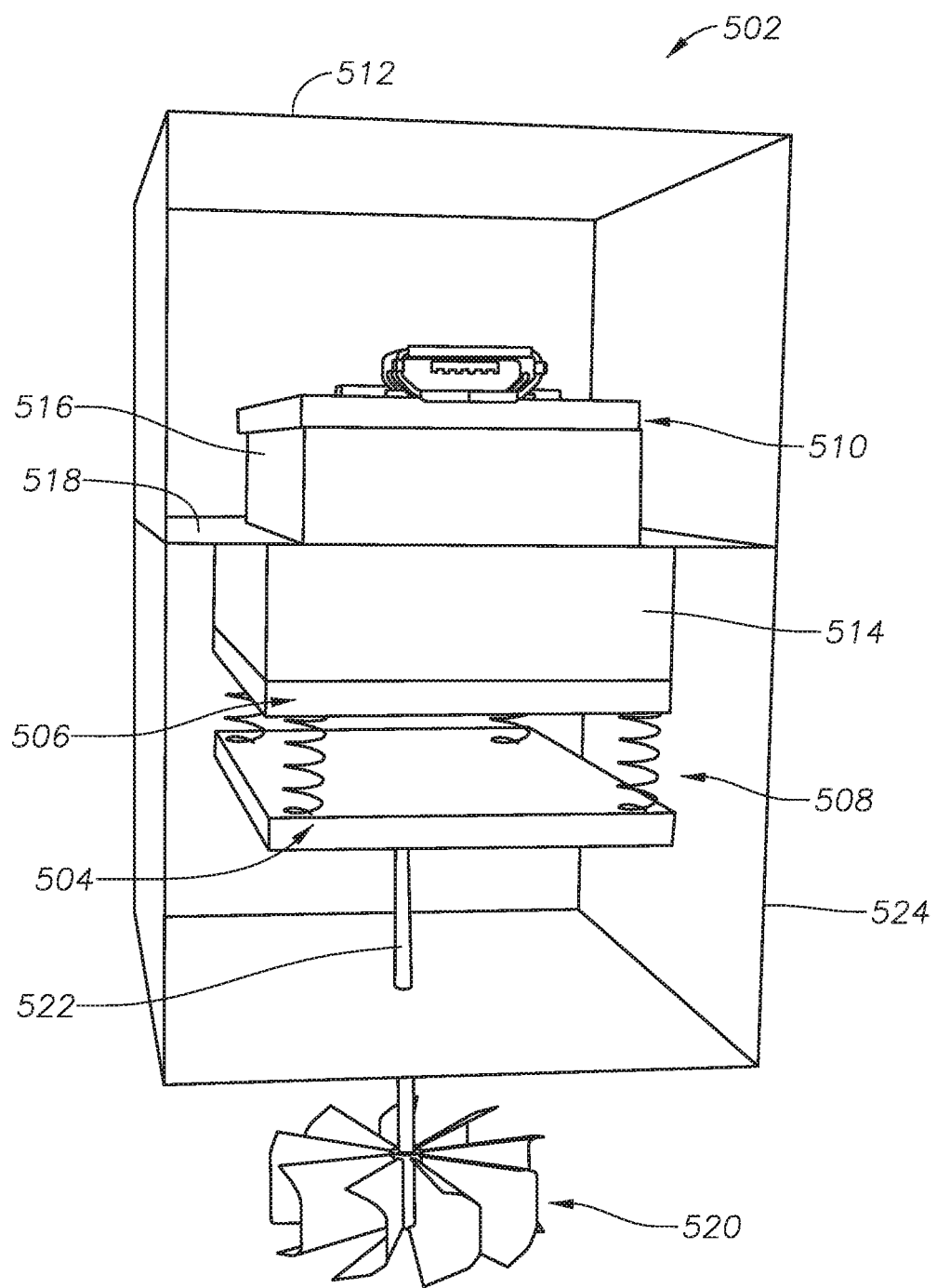
FIG. 5 is a schematic of a high temperature downhole power generating device comprising a high temperature downhole power generator, as well as sensors and instrumentation, according to one or more example embodiments.

Another example embodiment, illustrated in FIGS. 4 and 5, employs a mini-turbine or fan 420, 520 to capture the energy from mudflow and create friction between two materials, of opposite polarity, to generate electricity. The mini-turbine 420, 520 can be designed as a hydro turbine, pelton runner, etc. and is small enough to be integrated with the power generator and the MTU. The blades of the mini-turbine/fan 420, 520 are connected to the center shaft 422, 522. The kinetic energy of the mud flow in a drill string 120 rotates the blades of the mini-turbine/fan 420, 520. The mini-turbine or fan 420, 520 is connected to a shaft 422, 522 and the shaft 422, 522 is connected to material 404, 504. The shaft 422, 522 is used to generate linear motion when combined with a crank/slider-crank, dwell cam system or mechanical gears for example to push or slide material 404, 504 onto material 406, 506, which is opposite in polarity to material 404, 504 and is fixed and stationary, as shown in FIG. 4. The mini-turbine/fan 520 can also be used to push material 504 onto material 506, as shown in FIG. 5. Both these motions ensure the contact and separation of the materials to generate electricity. In mini-turbine/fan 420, 520 based systems the flow speed have to be optimized for maximum energy efficiency of the power generator.

The choice of materials depends on several factors. The most important is that the materials must be able to withstand high temperatures (>125° C.). Even though the MTU will be housed to minimize the effect of high temperature and pressure, it is important that the building blocks of the power generator has the ability to withstand high temperatures. This is because housing can only protect the components inside only up to a certain duration of time by conducting heat away from them according to its thermal coefficient of conduction. High durability is also an important consideration due to the repeated contact and release as well as sliding motions experienced by the materials. Materials must have good stability with little or no degradation in material properties after many cycles and they should not get damaged due to shock and vibrations. Some suitable materials are Copper, Aluminum, PTFE, Teflon, Kapton, Lead, Elastomer PDMA or any material that can cause static electricity, or any material with similar or better thermal, mechanical and chemical properties for downhole environments, which can also be deposited as thin films. Also, the materials should be relatively cheap if they are to be used in power generators to generate electricity for many transceivers. When choosing materials it is important to remember that they have opposite polarities or polarities as distant as possible from each other. Suitable materials for housing were described before. The choice of materials for the mini-turbine, fan and for the contact and sliding materials are the same as mentioned above.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

Example embodiments described in the above sections describe downhole power generation systems sufficient to supply required power for downhole sensors and instrumentation. The system is not affected by in-situ mud types. It is therefore designed to be a self-powered power generator, particularly suitable for utilization in high temperature (>125° C.) environments. Accordingly, one example embodiment is a high temperature downhole power generator (HT-DPG) that generates electricity. The HT-DPG uses mechanical and hydraulic energies in a typical well to generate friction between two materials of opposite polarities and creates power to power the downhole sensors to monitor and track information concerning the well. The materials may be made of Copper, Aluminum, PTFE, Teflon, Kapton, Lead, Elastomer PDMA or any material that can cause static electricity. The shapes of the materials, which may be in the form of blocks, can be rectangular, triangular, circular or any shape that maximizes the contact area depending on the design of the system. The system may also include a microcontroller and transceiver unit (MTU) that manages the power generated and controls the communication of information through the well to other transceivers. The information is stored on memory on the microcontroller and can be sent through wireless technologies through various transceivers throughout the well.

Another example embodiment is a high temperature, downhole power generator (HT-DPG) designed to generate electricity by using friction between two materials of opposite polarities or polarities as distant as possible from each other. Movement in a drilling environment, such as vibration and mud flow, may generate friction between two materials. One example embodiment provides for how the HT-DPG provides power to downhole sensors and instrumentation (S&I) and how the integration of HT-DPG and S&I paves the way for self-powered S&I systems.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A high temperature power generating device, the device comprising:
    a power generator including a first material of one polarity and a second material that is fixed in position relative to the first material and is of opposite polarity of the first material, wherein the first material is configured to be propelled toward the second material based on motion of the high temperature downhole power generator so that the two materials have a maximized point of contact to generate maximum power;
    at least one electrode that is connected to the first material or second material;
    a bridge rectifier connected to the at least one electrode to transform the power generated into direct current from alternating current;
    a storage unit for storing the power generated by the power generator;
    a first housing for housing the power generator, the electrode, and the bridge rectifier, wherein the first housing comprises a polymeric material; and
    a second housing for housing the storage unit, wherein the second housing comprises a material selected from the group consisting of certain solids, transition metals, as well as high strength alloys and/or compounds of the transition metals, and high temperature dewars.

2. The high temperature power generating device of claim 1, wherein the first material is suspended using one or more coil springs.

3. The high temperature power generating device of claim 1, further comprising a turbine operatively coupled to the first material for causing the first material to move towards the second material or away from the second material.

4. The high temperature power generating device of claim 1, wherein the storage unit comprising one of dielectric capacitors, ceramic film capacitors, electrolytic capacitors, supercapacitors, double-layer capacitors, or pseudo-capacitors.

5. The high temperature power generating device of claim 1, wherein the motion is caused due to vibration, rotation, mud flow, or noise in a drill string.

6. The high temperature power generating device of claim 1, wherein the first material and the second material are comprised of a material that causes static electricity.

7. The system of claim 6, wherein the first material and the second material are selected from the group consisting of Copper, Aluminum, Polytetrafluoroethylene (PTFE), Polyimide, Lead, Elastomer, Polydimethylacrylamide (PDMA), Nylon, and Polyester.

8. The system of claim 6, wherein the first material and the second material comprise a fire-resistant material.

9. The high temperature power generating device of claim 1, further comprising
    at least one sensor that gathers information concerning a downhole environment; and
    a microcontroller and transceiver unit to manage the power generated by the power generator and transmit information gathered by the at least one sensor, wherein the second housing comprises the microcontroller and the transceiver unit.

10. A method for power generation in a high temperature drilling environment, the method comprising:
    providing a first material of a first polarity;
    providing a second material of opposite polarity of the first material, wherein the second material is in a fixed position relative to the first material;
    propelling the first material toward the second material based on inherent motion in the drilling environment so that the first material and the second material have a maximized point of contact to generate maximum power;
operatively coupling at least one electrode to the first material or second material;
operatively coupling a bridge rectifier to the at least one electrode to transform the power generated into direct current from alternating current;
storing, in a storage unit, the power generated by friction between the first material and the second material;
providing a first housing for housing the power generator, the electrode, and the bridge rectifier, wherein the first housing comprises a polymeric material; and
providing a second housing for housing the storage unit, wherein the second housing comprises a material selected from the group consisting of certain solids, transition metals, as well as high strength alloys and/or compounds of the transition metals, and high temperature dewars.

11. The method of claim 10, further comprising:
operatively coupling at least one sensor to gather information concerning a downhole environment; and
operatively coupling a microcontroller and transceiver unit to manage the power generated by the first material and the second material, and transmit information gathered by the at least one sensor.

12. The method of claim 10, wherein the first material is suspended using one or more coil springs.

13. The method of claim 10, further comprising:
operatively coupling a turbine to the first material for causing the first material to move towards the second material or away from the second material.

14. The method of claim 10, wherein the storage unit comprising one of ceramic film capacitors, electrolytic capacitors, supercapacitors, double-layer capacitors, or pseudo-capacitors.

15. The method of claim 10, wherein the motion is caused due to vibration, rotation, mud flow, or noise in a drill string in the drilling environment.

16. The method of claim 10, wherein the first material and the second material are comprised of a material that causes static electricity.

17. The method of claim 16, wherein the first material and the second material are selected from the group consisting of Copper, Aluminum, Polytetrafluoroethylene (PTFE), Polyimide, Lead, Elastomer, Polydimethylacrylamide (PDMA), Nylon, and Polyester.

18. The method of claim 16, wherein the first material and the second material comprise a fire-resistant material.

19. The method of claim 11, wherein the second housing further comprises the microcontroller and the transceiver unit.

20. A high temperature downhole power generator comprising:
a first material of first polarity;
a second material that is fixed in position relative to the first material and is of opposite polarity of the first material, wherein the first material is configured to be propelled toward the second material based on motion in the downhole environment so that the first material and the second material have a maximized point of contact to generate maximum power;
at least one electrode that is connected to the first material or second material; and
a bridge rectifier connected to the at least one electrode to transform the power generated into direct current from alternating current;
a storage unit for storing the power generated by friction between the first material and the second material;
a first housing for housing the power generator, the electrode, and the bridge rectifier, wherein the first housing comprises a polymeric material; and
a second housing for housing the storage unit, wherein the second housing comprises a material selected from the group consisting of certain solids, transition metals, as well as high strength alloys and/or compounds of the transition metals, and high temperature dewars.

21. The high temperature downhole power generator of claim 20, further comprising:
at least one sensor that gathers information concerning a downhole environment; and
a microcontroller and transceiver unit to manage the power generated by the power generator and transmit information gathered by the at least one sensor, wherein the second housing comprises the microcontroller and the transceiver unit.

22. The high temperature downhole power generator of claim 20, wherein the first material is suspended using one or more coil springs.

23. The high temperature downhole power generator of claim 20, further comprising a turbine operatively coupled to the first material for causing the first material to move towards the second material or away from the second material.

24. The high temperature downhole power generator of claim 20, wherein the storage unit comprising one of di-electric capacitors, ceramic film capacitors, electrolytic capacitors, supercapacitors, double-layer capacitors, or pseudo-capacitors.

25. The high temperature downhole power generator of claim 20, wherein the first material and the second material are comprised of a material that causes static electricity.

26. The high temperature downhole power generator of claim 25, wherein the first material and the second material are selected from the group consisting of Copper, Aluminum, Polytetrafluoroethylene (PTFE), Polyimide, Lead, Elastomer, Polydimethylacrylamide (PDMA), Nylon, and Polyester.

27. The high temperature downhole power generator of claim 25, wherein the first material and the second material comprise a fire-resistant material.

* * * * *